Oct. 15, 1935. W. L. MARTIN Re. 19,724
APPARATUS FOR THERAPEUTIC AND OTHER PURPOSES
Original Filed Jan. 8, 1932 2 Sheets-Sheet 1
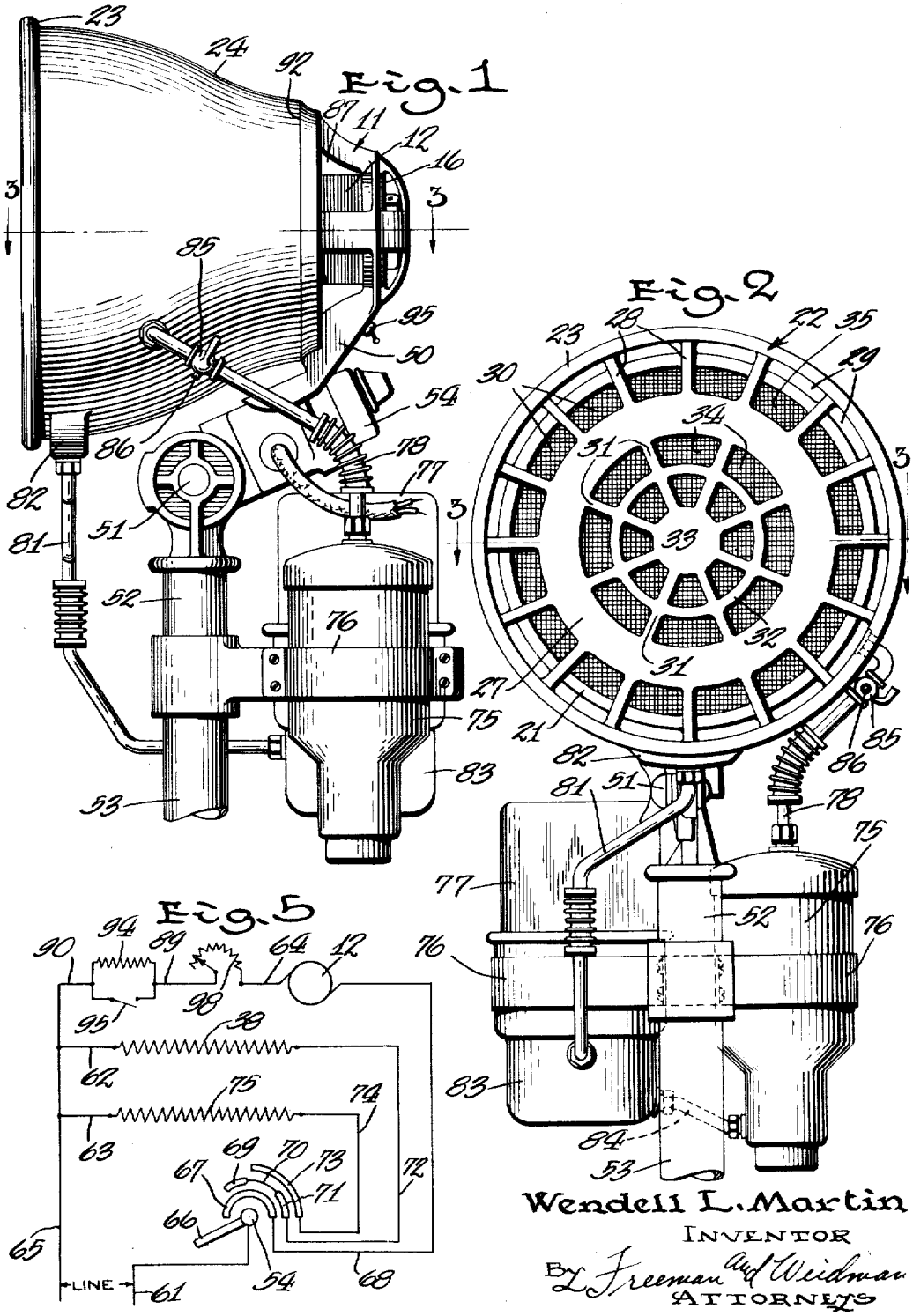
Wendell L. Martin
INVENTOR
By Freeman and Weidman
ATTORNEYS

APPARATUS FOR THERAPEUTIC AND OTHER PURPOSES

Original Filed Jan. 8, 1932 2 Sheets-Sheet 2

Wendell L. Martin
INVENTOR
By Freeman and Weidman
ATTORNEYS

Reissued Oct. 15, 1935

Re. 19,724

UNITED STATES PATENT OFFICE 19,724

APPARATUS FOR THERAPEUTIC AND OTHER PURPOSES

Wendell L. Martin, Cleveland, Ohio, assignor to The Martin Brothers Electric Company, Cleveland, Ohio, a corporation of Ohio Original No. 1,858,714, dated May 17, 1932, Serial No. 585,482, January 8, 1932. Application for reissue May 12, 1934, Serial No. 725,393

25 Claims. (Cl. 34—26)

My invention relates to apparatus for therapeutic and other purposes, and has particular reference to apparatus for use in steaming hair, or in drying hair or the hands or the like, and the principal object of my invention is to provide a new and improved apparatus of this type. This application is a continuation in part of my previous applications S. N. 352,429 and S. N. 509,132.

In the drawings accompanying this specification, and forming a part of this application, I have shown, for purposes of illustration, one form which my invention may assume, and in these drawings:

Figure 1 is a side elevation of the embodiment herein illustrated,

Figure 2 is a front elevation of this embodiment,

Figure 4 is a vertical section taken on the line 4—4 of Figure 3, and with parts omitted for clarity, while Figure 5 is a diagram to show the electrical connections.

Figure 3:
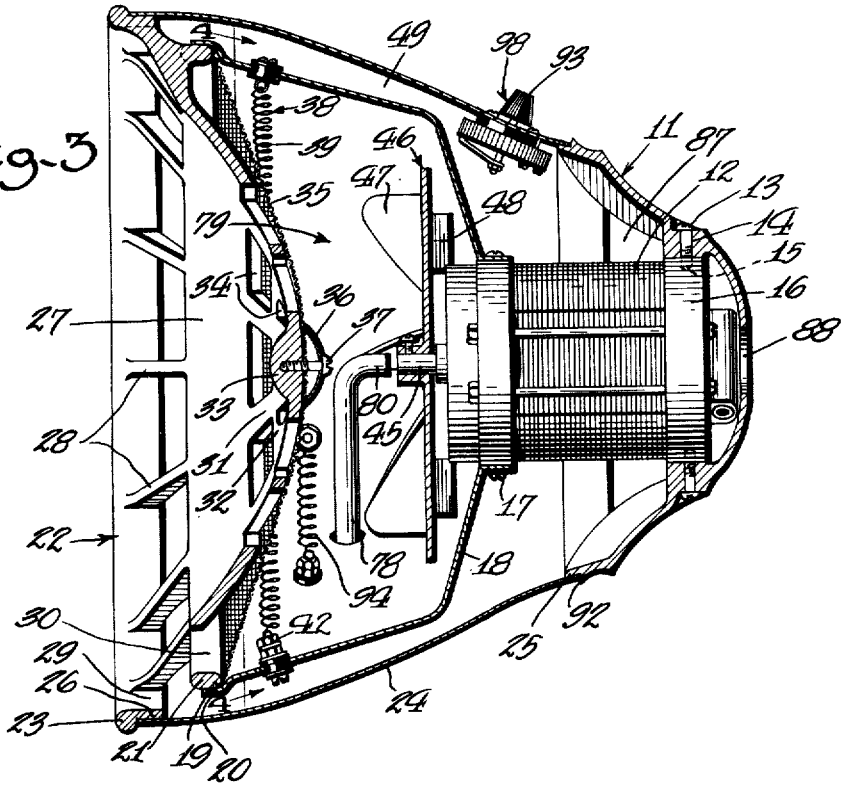
Figure 3 is a horizontal section taken on the lines 3—3 of Figures 1 and 2.
Figure 4:
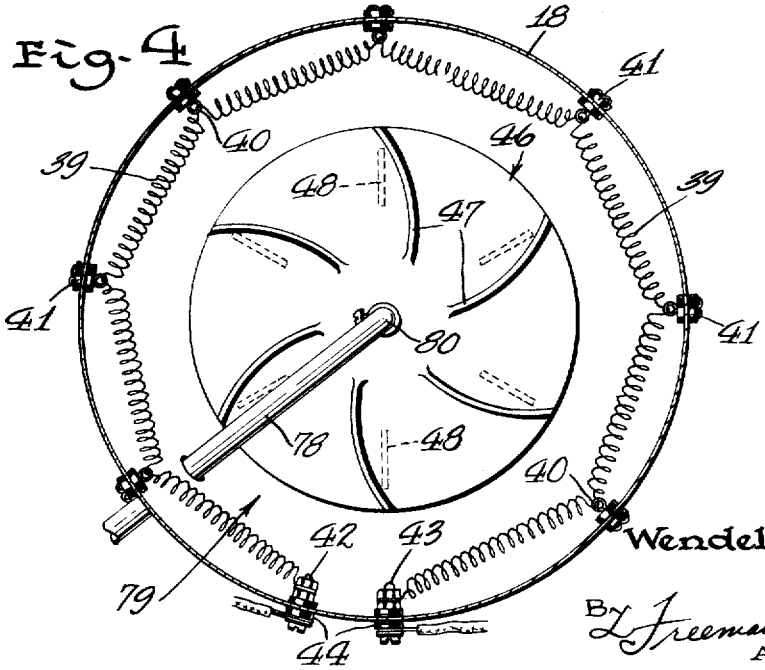

The embodiment of my invention herein shown comprises a supporting ring 11 carrying within itself an electric motor 12 secured thereto by machine screws 13 passing through apertures 14 in the supporting ring 11 and seating in cooperating screw-threaded apertures 15 in the rear end of the frame 16 of the motor 12, while secured to the front end of the motor frame 16 by means of machine screws 17 is a deflector 18 extending diagonally outwardly from the axis of the motor 12, and then diagonally longitudinally of the axis of the motor 12, and terminating in an outwardly flared flange 19 forming a seat 20 in which is received a ring 21 forming part of a face plate 22 provided on its outer periphery with a bead 23 forming an abutment for a shell 24 extending between a bead 92 on the supporting ring 11 and the bead 23 on the face plate 22 and embracing annular lips 25 and 26 formed respectively on the supporting ring 11 and the face plate 22.

The face plate 22 comprises also a relatively broad annular band 27 to which the ring 21 and bead 23 are connected by means of bars 28 forming with the ring 21 an annular grid consisting of an outer row of apertures 29 communicating with the spacing between the deflector 18 and the shell 24, and an inner row of apertures 30 communicating with the spacing just within the deflector 18.

Extending inwardly from the band 27 are further ribs 31 crossing an inner ring 32 to reach a center 33 and forming with the ring 32 and within the band 27 a second grid comprising two annular rows of apertures 34 both communicating with the center of the spacing within the deflector 18.

The apertures 29 provide a first outlet means, and the apertures 30 a second outlet means, while the apertures 34 provide an inlet means, and accordingly the apertures 29 and 30 and 34 provide two outlet means and one inlet means, each annularly arranged, but in the embodiment herein disclosed each interrupted over the central portion of the annular area, the inlet means by the center 33 lying inside the annular bounding periphery of the apertures 34 and spaced therefrom, and the second outlet means by the center 33 and apertures 34 and band 27, all lying inside the annular bounding periphery of the apertures 30 and spaced therefrom, and the first outlet means by the center 33 and apertures 34 and band 27 and apertures 30 and ring 21, all lying inside the annular bounding periphery of the apertures 29 and spaced therefrom, so that in the embodiment herein disclosed each annularly arranged outlet or inlet means is not the full area within the periphery of the annulus, but arcuate.

Positioned across all of the apertures affording access to the interior of the deflector 18 is a screen 35 effective to prevent insertion of any part of a body into the space within the deflector 18 and held in position at its periphery by interposition between the ring 21 of the face plate 22 and the seat 20 of the deflector 18 and at its center by a cupped washer 36 secured in position by a machine screw 37 received within the center 33 of the face plate 22.

Mounted within the deflector 18 rearwardly of the screen 35 is a heating element 38 comprising a coiled resistance wire 39 supported from the deflector 18 intermediate its ends by eyes 40 insulated from the deflector 18 by insulating bushings 41 and at its ends by terminal bolts 42 and 43 insulated from the deflector by insulating bushings 44.

Mounted on the shaft 45 of the motor 12 is a double centrifugal fan 46, the front part 47 formed to draw in air through the aperturing 34 of the face plate 22, force such air centrifugally against the deflector 18, and, by virtue of the shape of the deflector 18, expel such air through the aperturing 30 of the face plate 22 in the general direction of the axis of the fan 46 and motor 12 and swirling to a marked degree, and a second part 48 acting to draw air in through the motor 12 thus to prevent overheating of the motor 12, and then to introduce this air into the current set up by the first part 47. Of course the air current from the fan 46 passes over and is heated by the heating element 38, provided that element is energized, and consequently may be caused to emerge from the aperturing 30 warmed to a desired temperature. Furthermore the air emerging from the aperturing 30 creates an eddy which draws in air through the outermost aperturing 29 and thus sets up a flow of air through the annular spacing 49 between the deflector 18 and the shell 24 which when the heating element 38 is functioning absorbs heat from the deflector 18 to prevent overheating of the deflector 18 or objectionable heating of the shell 24. This air therefore reaches the aperturing 29 already heated, so that the co-mingling thereof with the air current from the aperturing 30 will not appreciably reduce the temperature of the total air current.

The supporting ring 11 is provided with a bracket 50 connected through an adjustable hinge 51 to the adjustable upper section 52 of a pedestal 53.

The device herein illustrated also comprises an electric steam generator 75 mounted in a bracket 76 which also supports a reservoir 77 and which is supported on the adjustable section 52 of the pedestal 53.

Extending from the electric steam generator 75 is a duct 78 for conducting steam from the generator 75 into the space 79 within the deflector 18, the duct 78 terminating in an open end 80 positioned just forwardly of the center of the fan 46. Condensation is returned to the reservoir 77 by means of a duct 81 leading from the pocket 82 at the bottom of the shell 24 down to the base 83 of the reservoir 77, and the reservoir 77 is connected to the generator 75 by means of a water feed duct 84.

The steam generator and reservoir may be of any suitable design, as in my previous application 509,132, and the flow of steam through the duct 78 may be controlled by a three-way valve 85 connecting the generator 75 either to the space 79 or to atmosphere through the vent duct 86.

From the foregoing description it will be obvious that operation of the motor 12 actuates the fan 46 to set up a main current of air from in front of the fan, and an auxiliary current from the rear of the fan, both uniting beyond the periphery of the fan. Also that this current will be deflected by the deflector 18, and will emerge from the outlet aperturing 30, and will emerge swirling. It also will be obvious that this current will entrain air from the outlet opening 29, to set up a current of air through the space 49 between the deflector 18 and the shell 24.

The air flowing through the space 49 enters the shell 24 through apertures 87 in the frame 11, while the air moved by the rear fan section 48 enters through the frame aperture 88 and reaches the fan section 48 through the motor 12. The air moved by the front fan section 47 enters through the inlet openings 34, and by reason of the proximity of the outlet openings 30, and of the nature of the outlet stream, entrains and includes a considerable portion of the outlet stream.

The device therefor is constructed to subject a body placed before the front 22 to the action of a current of fluid which is in part recirculated.

At the same time the device is also adapted to treat the fluid, either by heating the fluid, by means of the heating element 38, or by injecting vapor into the fluid, by means of the generator 75, or by injecting vapor and heating, by employing both the generator 75 and the heating element 38, and therefore is operable for subjecting to the action of an untreated stream of fluid, or of a treated stream of fluid, as may be desired.

And the treatment of course may be other than the heat and vapor herein disclosed.

The operation may be controlled conveniently by a switch 54 mounted on the bracket 50 and arranged to energize the motor 12 either with or without energization of either or both of the heating element 38 and the generator 75, thus to provide a current of air of either normal or raised temperature, and either without or with vapor.

When the device is to be employed for drying hair a variable air stream is desirable, and accordingly the embodiment herein shown comprises also a rheostat 98 connected in circuit with the motor 12, mounted on the shell 24 with its handle 93 projecting through the shell 24 readily accessible exteriorly of the shell 24. The rheostat 98, however, is disposed generally within the shell 24, protected by the shell 24, and in the air current flowing through the space 49 between the shell 24 and the deflector 18, whereby the heat from the rheostat 98 serves to heat the air flowing through the space 49 and at the same time the air flowing through the space 49 serves to maintain the rheostat 98 against overheating.

In the embodiment herein disclosed I include another resistance 94 also connected in circuit with the motor 12 but arranged to be short-circuited by a switch 95, and I form this resistance 94 of a value such that the motor 12 will operate at the same speed on direct current with the resistance 94 in circuit as on alternating current with the resistance 94 short-circuited by the switch 95. The resistance 94 is located adjacent the heating element 38, so that its heat serves to additionally heat the main air current and at the same time the main air current serves to prevent overheating of the resistance 94, while the switch 95 is mounted on the bracket 50 above the switch 54.

Under these circumstances I find it convenient to connect the parts as shown in Figure 5, wherein a first line conductor 61 is connected to the arm 66 of the control switch 54. The switch 54 is provided with a contact arm 66 adapted in its first position to engage only a contact bar 67 connected by a conductor 68 to the motor 12, to energize only the motor 12, but in its second position to engage both the contact bar 67 and also a contact bar 69 connected by a bridge 70 to a contact bar 71 and then by a conductor 72 to the heating element 38, to energize both the motor 12 and the heating element 38. In a third position the contact arm 66 engages both the contact bar 67 and also a contact bar 73 connected by a conductor 74 to the steamer 75, thus to energize both the motor 12 and the steamer 75, while in a fourth position the contact arm 66 engages the contact bar 67 and the contact bar 71 and the contact bar 73, to energize the motor 12 and the heater 38 and the generator 75.

In the first position the subjection is to a stream of untreated fluid, in the second position to a stream of heated fluid, in the third to a stream of vapor laden fluid, and in the fourth to a stream of heated vapor laden fluid. With air as the fluid, in the first position the device operates as a cold drier, in the second as a hot drier, in the third, with steam as the vapor, as a relatively cold steamer, and in the fourth, as a hot steamer. With other fluid, and/or with other treatment, the effect of course would be different, depending on the other fluid and/or treatment.

The valve 85 is provided merely to insure against inflow of vapor when it is desired to use the device as a drier just after it has been used as a steamer, and the vent 86 is provided to afford relief if the valve 85 is turned while the generator 75 is energized.

The heating element 38 is connected to the return line conductor 65 by a conductor 62, and the generator 75 by a conductor 63, while the motor 12 is connected by a conductor 64 to the rheostat 98, and the rheostat 98 is connected by a forked conductor 89 to the resistance 94 and switch 95 in parallel, and the resistance 94 and switch 95 are connected by a forked conductor 90 to the return line 65.

Under these circumstances it becomes obvious that by means of the switch 95 the device may be operated under the same conditions on either direct current or alternating current, and that by means of the rheostat 98 the speed of the motor may be varied, thus to vary the volume and speed of the fluid stream.

From the construction of the device it will be apparent that at all times there will be some recirculation of air, that is some of the air drawn in by the primary fan 47 through the central aperturing 34 will be air which has just been expelled by the fan through the intermediate aperturing 30; when the device is actually in use, however, that is when a body as a person's head or hands are adjacent the face plate 22, this recirculation will be greatly increased, in many cases to an extent where more than half of the air drawn in by the primary fan is recirculatory.

Obviously this recirculation of air greatly reduces the total treatment required for the circulated fluid, whether from the heating element 38, or from the generator 75, or from both, or from any other treating means, or from any combination of treating means, and constitutes an advantage of the device herein disclosed.

Under all these circumstances it will be obvious to those skilled in the art that the embodiment of my invention herein shown and described accomplishes at least the principal object of my invention. At the same time it also will be apparent that this particular embodiment may be put to other uses, and may be variously changed and modified, all without departing from the spirit of my invention or sacrificing the advantages thereof, and accordingly it will be understood that the disclosure herein is illustrative only, and that my invention is not limited thereto.

I claim:

1. A drier, comprising: a casing provided with an inlet and with an outlet; a circulator for drawing a stream of air in through said inlet and expelling such air through said outlet; a heater for heating such air; and a shell surrounding said casing, but spaced therefrom, and with said casing defining a passage opening into the stream of such air, whereby additional air is drawn through between said casing and said shell into said stream, absorbing heat from said casing to maintain said casing against overheating, and joining said stream only when at least partially heated.

2. A drier, comprising: a casing provided with an inlet and with an outlet; a circulator for drawing a stream of air in through said inlet and expelling such air through said outlet; a heater for heating such air; an electric motor for operating said circulator; a shell surrounding said casing, but spaced therefrom, and opening into the stream of such air, whereby additional air is drawn through between said casing and said shell into said stream, absorbing heat from said casing to maintain said casing against overheating, and joining said stream only when at least partially heated; and a resistance, connected in the circuit of said motor, located in the path of such additional air, serving to additionally heat such additional air, and maintained by such additional air against overheating.

3. A drier, comprising: a casing provided with an inlet and with an outlet; a circulator for drawing a stream of air in through said inlet and expelling such air through said outlet; a heater for heating such air; a universal electric motor for operating said circulator; a shell surrounding said casing, but spaced therefrom, and opening into the stream of such air, whereby additional air is drawn through between said casing and said shell into said stream, absorbing heat from said casing to maintain said casing against overheating, and joining said stream only when at least partially heated; a resistance unit, for inserting a resistance into circuit with said motor when said motor is operated on direct current, having its resistance located in said stream of air to additionally heat the air of said stream and at the same time be held thereby against overheating; and a rheostat, for controlling the speed of said motor, having its resistance located in the path of such additional air to additionally heat such additional air and at the same time be held thereby against overheating.

4. A recirculating drier comprising: a casing having an inlet through which air is drawn, and an outlet through which air is expelled, said inlet and outlet being arranged in juxtaposition; means carried by said casing for drawing a stream of exterior air and at least some of the air as expelled from said outlet inwardly into said casing and redirecting at least some of the same air of said stream outwardly and expelling it from said outlet; a heater for heating such air; and a shell surrounding said casing, but spaced therefrom, and defining a passage opening into the stream of such air, whereby additional exterior air is drawn between said casing and said shell, absorbing heat from said casing to maintain said casing against overheating, and joining said stream only when at least partially heated.

5. A recirculating drier comprising: a casing having annularly arranged inlet means through which air is drawn, and annularly arranged outlet means through which air is expelled, said inlet and outlet annular means being of different sizes and both providing passage for air through and within the compass of the larger annular means; means carried by said casing for drawing a stream of exterior air and at least some of the air as expelled from said outlet inwardly into said casing and redirecting at least some of the same air of said stream outwardly and expelling it from said outlet; a heater for heating such air; and a shell surrounding said casing, but spaced therefrom, and defining a passage opening into the stream of such air, whereby additional exterior air is drawn between said casing and said shell, absorbing heat from said casing to maintain said casing against overheating, and joining said stream only when at least partially heated.

6. A recirculating drier comprising: a casing having annularly arranged inlet means through which air is drawn, and annularly arranged outlet means through which air is expelled, said inlet and outlet annular means being of different sizes, and both providing passage for air through and within the compass of the outer annular means, said outlet means being arranged exteriorly of said inlet means; means carried by said casing for drawing a stream of exterior air and at least some of the air as expelled from said outlet inwardly into said casing and redirecting at least some of the same air of said stream outwardly and expelling it from said outlet; a heater for heating such air; and a shell surrounding said casing, but spaced therefrom, and defining a passage opening into the stream of such air, whereby additional exterior air is drawn between said casing and said shell, absorbing heat from said casing to maintain said casing against overheating, and joining said stream only when at least partially heated.

7. A recirculating drier comprising: a casing having annularly arranged inlet means through which air is drawn, and annularly arranged outlet means through which air is expelled, said inlet and outlet annular means being of different sizes and both providing passage for air through and within the compass of the larger annular means; means carried by said casing for drawing a stream of exterior air and at least some of the air as expelled from said outlet inwardly into said casing and redirecting at least some of the same air of said stream outwardly and expelling it from said outlet; a heater located in said outlet means for heating such air; and a shell surrounding said casing, but spaced therefrom, and defining a passage opening into the stream of such air, whereby additional exterior air is drawn between said casing and said shell, absorbing heat from said casing to maintain said casing against overheating, and joining said stream only when at least partially heated.

8. A recirculating drier comprising: a casing having annularly arranged inlet means through which air is drawn, and annularly arranged outlet means through which air is expelled, said inlet and outlet annular means being of different sizes, and both providing passage for air through and within the compass of the outlet means; said outlet means being disposed exteriorly of said inlet means; means carried by said casing for drawing a stream of exterior air and at least some of the air as expelled from said outlet inwardly into said casing and redirecting at least some of the same air of said stream outwardly and expelling it from said outlet; a heater located in said outlet means for heating such air; and a shell surrounding said casing, but spaced therefrom, and defining a passage opening into the stream of such air, whereby additional exterior air is drawn between said casing and said shell, absorbing heat from said casing to maintain said casing against overheating, and joining said stream only when at least partially heated.

9. A recirculating drier comprising: a casing having annularly arranged inlet means through which air is drawn, and annularly arranged outlet means through which air is expelled, said inlet and outlet annular means being arranged in juxtaposition; a centrifugal fan for drawing a stream of exterior air and at least some of the air as expelled from said outlet inwardly into said casing and said casing being formed for redirecting at least some of the same air of said stream outwardly and in a direction substantially parallel with the axis of said fan and expelling it from said outlet; a heater for heating such air; and a shell surrounding said casing, but spaced therefrom, and defining a passage opening into the stream of such air, whereby additional exterior air is drawn between said casing and said shell, absorbing heat from said casing to maintain said casing against overheating, and joining said stream only when at least partially heated.

10. A recirculating drier comprising: a casing having annularly arranged inlet means through which air is drawn, and annularly arranged outlet means through which air is expelled, said inlet and outlet annular means being of different sizes and both providing passage for air through and within the compass of the outer annular means, said outlet means being disposed exteriorly of said inlet means; a centrifugal fan for drawing a stream of exterior air and at least some of the air as expelled from said outlet inwardly into said casing and said casing being formed to deflect the air emerging from said fan into a stream moving in a direction substantially parallel to the axis of said fan, outwardly and expelling it from said outlet; a heater for heating such air; and a shell surrounding said casing, but spaced therefrom, and defining a passage opening into the stream of such air, whereby additional exterior air is drawn between said casing and said shell, absorbing heat from said casing to maintain said casing against overheating, and joining said stream only when at least partially heated.

11. A recirculating drier comprising: a casing having annularly arranged inlet means through which air is drawn, and annularly arranged outlet means through which air is expelled, said inlet and outlet annular means being of different sizes and both providing passage for air through and within the compass of the larger annular means, said outlet means being disposed exteriorly of said inlet means; means carried by said casing including a centrifugal fan for drawing a stream of exterior air and at least some of the air as expelled from said outlet inwardly into said casing and said casing being formed for redirecting at least some of the same air of said stream outwardly in a direction substantially parallel to the axis of said fan and expelling it from said outlet; a heater in said outlet means for heating such air; and a shell surrounding said casing, but spaced therefrom, and defining a passage opening into the stream of such air, whereby additional exterior air is drawn between said casing and said shell, absorbing heat from said casing to maintain said casing against overheating, and joining said stream only when at least partially heated.

12. A drier, comprising: a casing provided with an inlet and with an outlet and with an auxiliary inlet; an electric-motor driven circulator for drawing a stream of air in through said inlet and expelling such air through said outlet, and for drawing auxiliary air in through said auxiliary inlet, over the motor of said circulator to maintain said motor against overheating, and then into the stream of air drawn in through said inlet; a heater for heating said air; and a shell surrounding said casing, but spaced therefrom, and opening into said stream, whereby additional air is drawn through between said casing and said shell into said stream, absorbing heat from said casing to maintain said casing against overheating, and joining said stream only when at least partially heated.

13. A recirculating drier comprising: a casing having an inlet through which air is drawn, and an outlet through which air is expelled, said inlet and outlet being arranged in juxtaposition and said casing also having an auxiliary inlet; means carried by said casing and including an electric motor driven circulator for drawing a stream of exterior air and at least some of the air as expelled from said outlet inwardly into said casing and redirecting at least some of the same air outwardly and expelling it from said outlet, and for drawing auxiliary air in through said auxiliary inlet, over the motor of said circulator to maintain said motor against overheating, and then into the stream of air drawn in through said inlet; a heater for heating such air; and a shell surrounding said casing but spaced therefrom and defining a passage whereby additional air is drawn through between said casing and said shell into said stream, absorbing heat from said casing to maintain said casing against overheating, and joining said stream only when at least partially heated.

14. A recirculating drier comprising: a casing having an inlet through which air is drawn, and an outlet through which air is expelled, said inlet and outlet being arranged in juxtaposition and said casing also having an auxiliary inlet; means carried by said casing and including an electric motor driven centrifugal fan for drawing a stream of exterior air and at least some of the air as expelled from said outlet inwardly into said casing and said casing being formed to deflect the air emerging from said fan into a stream moving outwardly in a direction substantially parallel to the axis of said fan and expelling it from said outlet, and for drawing auxiliary air in through said auxiliary inlet, over the motor of said circulator to maintain said motor against overheating, and then into the stream of air drawn in through said inlet; a heater for heating such air; and a shell surrounding said casing but spaced therefrom and defining a passage whereby additional air is drawn through between said casing and said shell into said stream, absorbing heat from said casing to maintain said casing against overheating, and joining said stream only when at least partially heated.

15. Apparatus, as of the type described, for subjecting a person to the action of a stream of vapor-carrying gaseous-like fluid, comprising: an open-front casing, including fluid-directing means, and having its mouth formed to be directed toward and partially receive the subject to be treated, said mouth having an inlet area and an outlet area, and said outlet area embracing said inlet area; vapor injecting means, operating within said casing, for inserting vapor into the fluid circulated by said apparatus; means for preventing accidental contact of said subject with said vapor-injecting means; and fluid-circulating means within said casing; said fluid-circulating means and said fluid-directing means operating together to indraw through said inlet area an inflowing stream of fluid, and to double back said fluid upon itself and expel said fluid through said outlet area, and said apparatus comprising means whereby said fluid is expelled about said subject, and in proximity to said inflowing stream, to be in part entrained in said inflowing stream, whereby part of said fluid is recirculated, to reduce the amount of vapor required to be inserted to maintain said fluid at desired condition.

16. Apparatus, as of the type described, for subjecting a person to the action of a stream of vapor-carrying gaseous-like fluid, comprising: an open-front casing, including fluid-directing means, and having its mouth formed to be directed toward and partially receive the subject to be treated, said mouth having an inlet area and an outlet area, and said outlet area embracing said inlet area; vapor injecting means, operating within said casing, for inserting vapor into the fluid circulated by said apparatus; means for preventing accidental contact of said subject with said vapor-injecting means; and fluid-circulating means within said casing; said fluid-circulating means and said fluid-directing means operating together to indraw through said inlet area an inflowing stream of fluid, and to expel said fluid through said outlet area, and said apparatus comprising means whereby said fluid is expelled about said subject, and in proximity to said inflowing stream, to be in part entrained in said inflowing stream, whereby part of said fluid is recirculated, to reduce the amount of vapor required to be inserted to maintain said fluid at desired condition.

17. Apparatus, as of the type described, for subjecting a person to the action of a stream of heated vapor-carrying gaseous-like fluid, comprising: an open-front casing, including fluid-directing means, and having its mouth formed to be directed toward and partially receive the subject to be treated, said mouth having an inlet area and an outlet area, and said outlet area embracing said inlet area; vapor injecting means, operating within said casing, for inserting vapor into the fluid circulated by said apparatus; an electric heater, operating within said casing, for heating the fluid circulated by said apparatus; means for preventing accidental contact of said subject with said vapor-injecting means and said heater; and fluid-circulating means within said casing; said fluid-circulating means and said fluid-directing means operating together to indraw through said inlet area an inflowing stream of fluid, and to double back said fluid upon itself and to expel said fluid through said outlet area, and said apparatus comprising means whereby said fluid is expelled about said subject, and in proximity to said inflowing stream, to be in part entrained in said inflowing stream, whereby part of said fluid is recirculated, to reduce the amount of vapor and heat required to maintain said fluid at desired condition and temperature.

18. Apparatus, as of the type described, for subjecting a person to the action of a stream of heated vapor-carrying gaseous-like fluid, comprising: an open-front casing, including fluid-directing means, and having its mouth formed to be directed toward and partially receive the subject to be treated, said mouth having an inlet area and an outlet area, and said outlet area embracing said inlet area; vapor injecting means, operating within said casing, for inserting vapor into the fluid circulated by said apparatus; an electric heater, operating within said casing, for heating the fluid circulated by said apparatus; means for preventing accidental contact of said subject with said vapor-injecting means and said heater; and fluid-circulating means within said casing; said fluid-circulating means and said fluid-directing means operating together to indraw through said inlet area an inflowing stream of fluid, and to expel said fluid through said outlet area, and said apparatus comprising means whereby said fluid is expelled about said subject, and in proximity to said inflowing stream, to be in part entrained in said inflowing stream, whereby part of said fluid is recirculated, to reduce the amount of vapor and heat required to maintain said fluid at desired condition and temperature.

19. An apparatus for drying by fluid circulation comprising an outer shell open at its front and rear ends, hollow supporting means for said shell engaging the rear end thereof, and in communication with the open atmosphere, a motor supported by said means in axial alignment with said shell, an inner shell axially aligned with and supported by said first shell, said inner shell being spaced from the inner wall of said first shell for forming a substantially ring-shaped passage between said shells, and a circulator supported and driven by said motor in axial alignment with said shells, said circulator being a centrifugal fan adapted to draw air into said inner shell, and said outer and inner shells being in open communication at their front ends to permit of fresh air being drawn from said ring-shaped passage into said inner shell.

20. An apparatus for drying by fluid circulation comprising an outer shell open at its front and rear ends, hollow supporting means for said shell provided with openings in its wall portion and in communication with the rear end of said shell, a motor supported by said supporting means opposite the rear end of said shell, an inner shell axially aligned with and supported by said first shell, said inner shell being spaced from the inner wall of said first shell for forming a substantially ring-shaped passage between said shells, and a circulator supported and driven by said motor in axial alignment with said shells, said outer and inner shells being in open communication at their front ends to permit of fresh air being drawn from said ring-shaped passage into said inner shell.

21. An apparatus for drying by fluid circulation comprising an outer shell open at its front and rear ends, hollow supporting means for said shell provided with openings in its wall portion and secured to and in communication with the rear end of said shell, a motor supported by said supporting means opposite the rear end of said shell, an inner shell within said first shell spaced from the front end thereof and supported thereby, said inner shell being also spaced from the inner wall of said first shell for forming a substantially ring-shaped passage between said shells, and a circulator supported and driven by said motor, said outer and inner shells being in open communication at their front ends to permit of fresh air being drawn from said ring shaped passage into said inner shell.

22. An apparatus for drying by fluid circulation comprising an outer shell open at its front and rear ends, chambered supporting means for said shell provided with openings in its wall for free communication with the open air and secured to and in communication with the rear end of said shell, a motor mounted within said supporting means opposite the openings thereof in axial alignment with said shell, an inner shell within said first shell spaced from the front end thereof and supported thereby, said inner shell being also spaced from the inner wall of said first shell for forming a substantially ring-shaped passage between said shells, and a circulator supported and driven by said motor, said outer and inner shells being in open communication at their front ends to permit of fresh air being drawn from said ring shaped passage into said inner shell.

23. An apparatus for drying by fluid circulation comprising an outer shell open at its front and rear ends, hollow supporting means for said shell engaging the rear end thereof and in communication with the open atmosphere, a motor supported by said means in axial alignment with said shell, an inner shell axially aligned with and supported by said first shell, said inner shell being spaced from the inner wall of said first shell for forming a substantially ring shaped passage between said shells, a motor controlling rheostat arranged within said ring-shaped passage for preheating air passing therethrough and a circulator supported and driven by said motor, said outer and inner shells being in open communication at their front ends to permit of fresh preheated air being drawn from said ring-shaped passage into said inner shell.

24. An apparatus for drying by fluid circulation as described in claim 23, wherein said shells are connected with each other by a third shell having perforated areas opposite said inner shell and the said ring shaped passage.

25. An apparatus for drying by fluid circulation comprising an outer shell open at its front and rear ends, hollow supporting means for said shell provided with openings in its wall portion and secured to and in communication with the rear end of said shell, a motor supported by said supporting means opposite the rear end of said shell, an inner shell within said first shell spaced from the front end thereof and supported thereby, said inner shell being also spaced from the inner wall of said first shell for forming a substantially ring-shaped passage between said shells, a motor controlling rheostat arranged within said ring-shaped passage for preheating air passing therethrough, a circulator supported and driven by said motor and heating means for the air circulating through said inner shell, said heating means and said motor being independently operable and said outer and inner shells being in open communication at their front end to permit of fresh preheated air being drawn from said ring-shaped passage into said inner shell.

WENDELL L. MARTIN.